United States Patent
Le Goff et al.

(10) Patent No.: US 8,400,489 B2
(45) Date of Patent: Mar. 19, 2013

(54) METHOD OF CONTROLLING A VIDEO CONFERENCE

(75) Inventors: Pascal Le Goff, Tremaouezan (FR); Yves Blanchard, Plougastel-Daoulas (FR)

(73) Assignee: Alcatel Lucent, Paris (FR)

( * ) Notice: Subject to any disclaimer, the term of this patent is extended or adjusted under 35 U.S.C. 154(b) by 434 days.

(21) Appl. No.: 12/667,463

(22) PCT Filed: Sep. 13, 2007

(86) PCT No.: PCT/IB2007/003721
§ 371 (c)(1),
(2), (4) Date: Dec. 31, 2009

(87) PCT Pub. No.: WO2009/034412
PCT Pub. Date: Mar. 19, 2009

(65) Prior Publication Data
US 2010/0188475 A1      Jul. 29, 2010

(51) Int. Cl.
*H04N 7/14*            (2006.01)
(52) U.S. Cl. ............... 348/14.08; 348/14.09; 348/14.07; 348/14.12
(58) Field of Classification Search .... 348/14.01–14.16; 709/204
See application file for complete search history.

(56) References Cited

U.S. PATENT DOCUMENTS

| 5,572,728 | A  | * | 11/1996 | Tada et al. ........................ 1/1 |
| 2007/0005698 | A1 | * | 1/2007 | Kumar et al. .................. 709/204 |

FOREIGN PATENT DOCUMENTS

| EP | 1 381 237 A2 | 1/2004 |
| EP | 1 478 178 A1 | 11/2004 |

OTHER PUBLICATIONS

International Search Report.

* cited by examiner

*Primary Examiner* — Melur Ramakrishnaiah
(74) *Attorney, Agent, or Firm* — Fay Sharpe LLP

(57) ABSTRACT

The invention concerns a method of controlling a video conference with two or more participants (1, 2, 3, 4), and a video conference server and a computer program product to execute this method. A topic of the video conference is dynamically determined (303, 313). A participant data base comprising associations of one or more of the participants (1, 2, 3, 4) with one or more respective attributes is accessed (304, 314). The determined topic is mapped to one or more of the one or more respective attributes. From the one or more participants (1, 2, 3, 4) associated with the one or more respective attributes one or more participants (1, 2, 3, 4) who are associated with the determined topic according to said mapping are selected (305, 315). One or more of the selected participants (1, 2, 3, 4) are displayed (307, 317) on a screen.

10 Claims, 3 Drawing Sheets

*Fig. 2*

| | 201 | 202 | 203 | 204 |
|---|---|---|---|---|
| | Participant | Project 1 | Project 2 | Known Languages |
| 205 | 1 | WWW | TTT | French English |
| 206 | 2 | XXX | YYY | French Chinese |
| 207 | 3 | ZZZ | YYY | French |
| 208 | 4 | YYY | XXX | French |

METHOD OF CONTROLLING A VIDEO CONFERENCE

BACKGROUND OF INVENTION

The invention is based on a priority application PCT/IB2007/003721 which is hereby incorporated by reference.

The invention relates to a method of controlling a video conference, a video conference server and a computer program product for executing said method.

DE 199 63 102 A1 describes a visual telephone device which comprises a telephone device for sending and receiving audio and video data, a displaying device, a picture recording device, a microphone device, and localisation means. The localisation means determine the spatial position of the microphone held by a calling person. The determined data are used to arrange the picture recording device in such a way that the calling person's head is captured. Then the picture data of the calling person are sent together with the voice data to the other calling person. Picture data received from the other calling person are displayed on the displaying device, favourably a television set. The advantage of this device with regard to prior art visual telephone devices is that the calling person is not required to remain at a fixed position.

Currently, if there are many participants in a videoconference, the video display features the speaker and/or a set of smaller windows with all the other participants. As the windows are small (due to the fact that there are many participants in the video conference), it is difficult to assess the reactions of people who are stakeholders of the current topic being addressed. During a public TV conference, several cameramen can specifically focus on people who deal with the subject being currently addressed. The cameramen are being told who to display by a director.

SUMMARY OF INVENTION

It is the object of the present invention to provide an improved video conference control.

The object of the present invention is achieved by a method of controlling a video conference with two or more participants whereby the method comprises the steps of dynamically determining a topic of the video conference, accessing a participant data base comprising associations of one or more of the participants with one or more respective attributes, mapping the determined topic to one or more of the one or more respective attributes, selecting from the one or more participants associated with the one or more respective attributes one or more participants who are associated with the determined topic according to said mapping, and displaying one or more of the selected participants on a screen. Furthermore, the object of the present invention is achieved by a video conference server for controlling a video conference with two or more participants, wherein the video conference server comprises a control unit adapted to dynamically determine a topic of the video conference, access a participant data base comprising associations of one or more of the participants with one or more respective attributes, map the determined topic to one or more of the one or more respective attributes, select from the one or more participants associated with the one or more respective attributes one or more participants who are associated with the determined topic according to said mapping, and control the display of one or more of the selected participants on a screen. And the object of the present invention is achieved by a computer program product for controlling a video conference with two or more participants, whereby the computer program product, when executed by a video conference server, performs the steps of dynamically determining a topic of the video conference, accessing a participant data base comprising associations of one or more of the participants with one or more respective attributes, mapping the determined topic to one or more of the one or more respective attributes, selecting from the one or more participants associated with the one or more respective attributes one or more participants who are associated with the determined topic according to said mapping, and triggering the display of one or more of the selected participants on a screen.

With the new solution, a limited number of participants are displayed on the screen. When the speaker in talking about a subject, the participants of the video conference can see the face reaction of the involved participants about what he is saying. Another participant therefore knows immediately who are the relevant stakeholders.

During the videoconference, the displays of participants change when subjects change. The control of the video conference is interactive and dynamic. The invention also means an optimization of the resources of the video conference because only displayed people may be seen at a high definition The invention tightly couples audio filtering and detection capabilities with a layout of the screen, and therefore improves the attention of the participants of a video conference. The layout of the screen dynamically changes, adjusting to the current conditions of the video conference, and therefore provides a support to the comprehension of the video conference.

The invention provides the possibility to clearly see relevant participants of a video conference on the same screen, and to see the reactions of people who are involved in the current topic that the speaker is talking about. So the experience of the videoconference is close to a face-to-face meeting.

Further advantages are achieved by the embodiments of the invention indicated by the dependent claims.

Each of the participants is connected to a telecommunication network used for the video conference. During the video conference, each of the participants is imaged by a camera, e.g. a webcam, thus providing video data. One or more of the participants speak during the video conference, thus providing voice data. The video data and the voice data originating from the participants are transmitted to a central point of the network, i.e., the video conference server. The transmission of the video data is called video traffic, the transmission of the voice data is called voice traffic.

Furthermore, it is possible that one or more of the participants is not imaged by a camera, but that video data of those participants, e.g. a photograph, is stored and provided by the video conference server or the telecommunications terminal of the participant.

According to a preferred embodiment of the invention, the voice traffic which is exchanged between the two or more participants during the video conference is monitored by the video conference server. The video conference server gathers the voice traffic incoming from the speaking participants and analyses the gathered voice traffic. Preferably, the control unit of the video conference server controls the processing of the voice and video traffic. The voice traffic comprises natural spoken language. The control unit of the video conference server analyses the voice traffic received from the speaking participants by means of a lexical, syntactic and semantic analysis. Preferably, the control unit deconstructs a natural language sentence in a sequence of word entities, analyses the word entities semantically, discards insignificant words such as "and", "we", "of", "thus", etc., extracts keywords such as "project XXX", "project WWW", etc. and thus tracks the change of keywords currently discussed in the video conference. Thus, the control unit extracts information from the received voice traffic that is necessary for determining a topic.

It is also possible that the participants are fully aware of the automatic control of the video conference. Some keywords like "project" may have been pre-defined as common-known keywords. Thus, the participants are obliged to speak keywords such as "project XXX" especially clear and well pronounced. This simplifies the operation of the control unit.

It is also possible that the control unit generates a statistics of the extracted keywords that is continuously updated. The control unit may assume that the last extracted keyword characterises the currently discussed topic. It is also possible that the keyword which has been mentioned most often during a past time period, e.g., during the last minute, is considered relevant. Form the dynamically updated statistics of the keywords, the control unit deduces the topic of the video conference.

In a preferred embodiment of the invention, the topic of the video conference that is currently discussed is determined by tracking a pre-defined agenda of the video conference. The agenda may indicate the topics of the video conference and the start and/or end time associated with a respective topic. For example, the agenda may be like: 9h00 begin, 9h03 project TTT, 9h10 project WWW, 9h25 project XXX, 9h30 project YYY, 9h35 end. The video conference server refers to a clock and determines which participants have to be displayed at each time step, e.g., seconds. It is also possible that one or more of the participants have a possibility to dynamically adjust the agenda during the video-conference, e.g. is an unexpected delay has occurred, to bring the agenda in conformity with the actual progress.

Preferably, the video conference server determines a change of the currently discussed topic of the video conference and continuously adapts the display of one or more of the selected participants on the screen according to the change. It is possible that the main speaker associated with a topic changes as the topic changes. It is also possible that participants who are relevant to a topic change as the topic changes. The video conference server monitors the voice data and/or the pre-defined agenda and determines, out of the monitoring results, the currently discussed topic. The video conference server changes the screen display to the currently relevant participants according to the currently discussed topic.

With respect to the voice recognition, a sequence of words in a sentence corresponding to various attributes should not make many changes of the associated participants. Therefore, a tool of recognition of context is provided that determines that a participant is well speaking about a new topic and, at this time, switches to a new display. Preferably, a minimum time of display is imposed on each newly determined screen layout. This way, unwanted short-term changes of the screen layout will be avoided, e.g., when a speaker discussing a topic A only refers in a subordinate manner to a topic B.

All participants are automatically or manually associated with skills and/or tasks and/or topics. It is possible that the video conference server accesses a data base where associations of participants with attributes, e.g., skills and/or tasks and/or topics, can be retrieved. For example, a video conference is scheduled within a corporation whereby all the participants of the video conference belong to the corporation. The video conference has access to the corporate employee data base where all the personal data and attributes, e.g., tasks/topics, of all employees of the corporation are stored. On log-in of an employee as participant to the video conference server, e.g., with the employee using a login name that is used in the corporate employee data base, the video conference server retrieves from the corporate employee data base the relevant data associated with the participant and takes the relevant data over into the participant data base. The participant data base lists the participants of the video conference and the respective attributes of a participant.

It is also possible that a video conference is scheduled with participants from different corporation. As each corporation keeps its confidential data non-accessible for third parties, the video conference server cannot access the personal data bases kept in the respective corporations. On log-in of a participant to the video conference server, the video conference server requests the participant to provide the relevant data associated with the participant and takes the provided relevant data over into the participant data base.

Attributes, i.e., relevant data associated with the participant, may be skills of the participants, e.g., language skills or computer skills, tasks and projects of the participant, topics on the agenda of the video conference, ethnic background, etc.

According to another preferred embodiment of the invention, the video conference server displays simultaneously at least one speaking participant of the video conference and all of the selected participants on the screen, each in a separate window. For example, the screen may show on the right half of the screen a currently reporting participant, e.g., speaking about the project XXX, and on the left half of the screen two participants that are involved in the project XXX.

It is further possible that one or more pre-defined attributes are stored in a directory, e.g., a corporate employee data base or a data base generated by a person in charge of the video conference. When a participant of the video conference joining the video conference by logging in to the video conference server, the video conference server presents the joining participant a selection menu. The selection menu may use a GUI or be implemented as a speech-controlled selection process (GUI=Graphical User Interface). The selection menu comprises the one or more pre-defined attributes which are stored in the directory. The joining participant selects one or more of the pre-defined attributes from the directory as being associated with the joining participant. The video conference server generates an entry in the participant data base, the entry comprising an identifier of the joining participant and an association of the joining participant with the selected one or more attributes.

BRIEF DESCRIPTION OF THE DRAWINGS

These as well as further features and advantages of the invention will be better appreciated by reading the following detailed description of presently preferred exemplary embodiments taken in conjunction with accompanying drawings of which:

FIG. 2 is a participant data base according to an embodiment of the invention.

FIG. 1 shows a video conference system 100 where participants 1, 2, 3 and 4, each at a different location, are engaged in a video conference via a telecommunications network 7. Each of the participants 1, 2, 3 and 4 is associated with a respective telecommunications terminal 10, 20, 30, 40 connected to the telecommunication network 7, either via wireless or wire-line connections. Each of the telecommunications terminals 10, 20, 30, 40, e.g., a computer work station or a mobile telephone, comprises respective input means 11, 21, 31, 41, e.g., a keypad/mouse and a microphone, respective output means 12, 22, 32, 42, e.g., a video screen and a loudspeaker, and a camera 13, 23, 33, 43 for photographic shooting of the respective participants 1, 2, 3 and 4.

Figure 1:
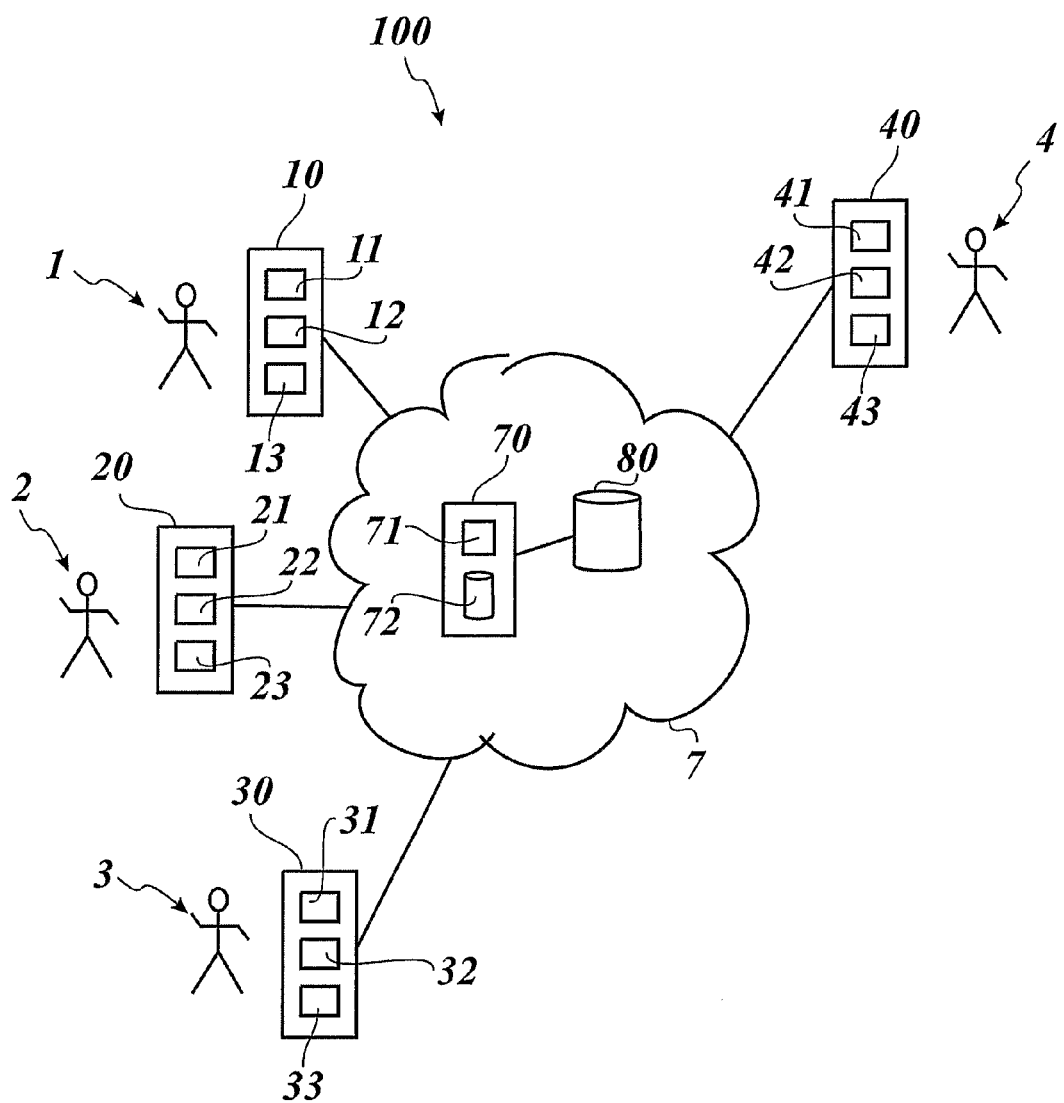
FIG. 1 is a block diagram of a system for controlling a video conference according to an embodiment of the invention.

The input means 11, 21, 31, 41 receive voice signals (input via the microphones) from the participants 1, 2, 3, 4 and generate corresponding voice input data. Furthermore, the input means 11, 21, 31, 41 receive control data (input via microphone and/or keypad/mouse) from the participants' 1, 2, 3, 4. The voice input data and the control data are sent from the terminals 10, 20, 30, 40 to a video conference server 70 of the telecommunication network 7. The cameras 13, 23, 33, 43 image each of the participants 1, 2, 3, 4, generate corresponding video input data. The video input data are sent from the terminals 10, 20, 30, 40 to the video conference server 70.

Furthermore, it is possible that one or more of the participants is not imaged by a camera, but that video data of those participants, e.g. a photograph, is stored and provided by the video conference server or the telecommunications terminal of the participant.

The video conference server 70 is connected to an external data base 80 accessible via the telecommunications network 7. The video conference server 70 collects the voice input data, the video input data and the control data. The video conference server 70 processes the received input data and generates out of the input data video output data to be displayed on the screens of the output means 12, 22, 32, 42 and voice output data to be output on the loudspeakers of the output means 12, 22, 32, 42.

The video conference server 70 is composed of one or several interlinked computers, i.e., a hardware platform, a software platform basing on the hardware platform and several application programs executed by the system platform formed by the software and hardware platform. The functionalities of the video conference server 70 are provided by the execution of these application programs. The application programs or a selected part of these application programs constitute a computer software product providing a video conference control as described in the following, when executed on the system platform. Further, such computer software product is constituted by a storage medium storing these application programs or said selected part of application programs. From functional point of view, the video conference server 70 comprises a control unit 71 and a memory unit 72.

When the participants 1, 2, 3, 4 want to join the video conference, they log in at the video conference server 70. Thus, the control unit 71 of the video conference server 70 receives from each of the participants 1, 2, 3, 4 an identifier for identification of the participants 1, 2, 3, 4. Let us assume that all participants 1, 2, 3, 4 belong to the same company. The video conference server 70 accesses a company's employee data base 80, determines, on the basis of the participants' 1, 2, 3, 4 identifiers, entries in the data base which are associated with the participants 1, 2, 3, 4 and retrieves from this data base attributes that are associated with the participants 1, 2, 3, 4.

From the retrieved data associated with the participants 1, 2, 3, 4, the control unit 71 of the video conference server 70 generates a participant data base and stores it in the memory unit 72. Alternatively, the participant data base may be generated by the control unit 71 at the login of the participants based on data inputs the participants are requested to make in order to receive access to the video conference.

FIG. 2 shows the aforementioned participant data base 200 where each of the four participants 1, 2, 3, 4 is associated with topics and skills. The association is represented in form of a table 200 with columns 201, 202, 203, 204 and lines 205, 206, 207, 208. The first column 201 gives the participants 1, 2, 3, 4 of the video conference, e.g., by listing a respective identifier, a name, a telephone number, a SIP address, an email address, a login name, etc (SIP=Session Initiation Protocol). The second column 202 gives a first project associated with the respective participants 1, 2, 3, 4. The third column 203 gives a second project associated with the respective participants 1, 2, 3, 4. The fourth column 204 gives a skill, in particular language skills associated with the respective participants 1, 2, 3, 4. For example, line 207 gives an entry with respect to the participant 3. The participant 3 is involved in the projects ZZZ and YYY and can speak French.

Figure 3:
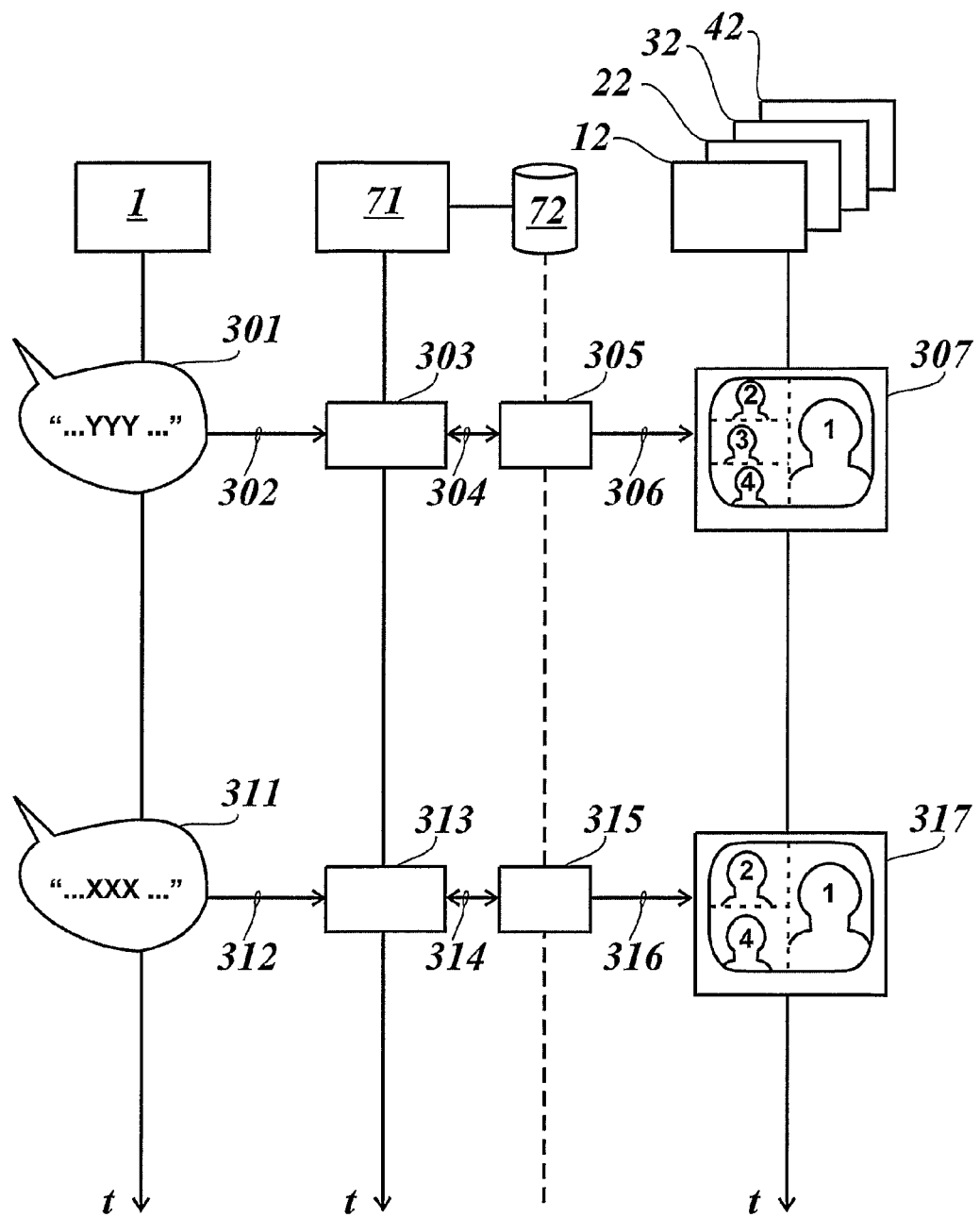
FIG. 3 is a message flow diagram showing a course action of a video conference according to an embodiment of the invention.

FIG. 3 gives a temporal (t=time) course of action of a video conference among the participants 1, 2, 3, 4. Let us assume a state of the video conference where the participant 1 speaks 301 while the other participants 2, 3, 4 2 are currently passive, i.e., listen. The participant 1 currently speaks 301 about the project YYY.

The acoustic signals 301 from the participant 1 are received by the microphone of his input means 11, converted by the microphones 15, 16 into voice signals and transmitted to a control unit of the terminal 10. There the voice signals are converted into voice data and sent 302 from the terminal 11 to the video conference server 70.

The voice data are received at the video conference server 70 and subjected to a processing in the control unit 71. The intensity of the voice data received from the microphone of participant 1 is compared with the intensity of the voice data received from the microphones of the other participants 2, 3, 4. From this comparison, it is deduced that the participant 1 is the main speaker and the other participants 2, 3, 4 are listeners.

Next, the participant's 1 voice data are subjected to a voice filtering procedure and voice recognition procedure. The voice filtering procedure is adapted to filter human voices from any spurious acoustic signals like traffic noise, machine noise, background sounds. The voice filtering may be based on the fact that the main contributions of the different sound types like, e.g., human voices, traffic noise, background noise (coughing, turning pages, etc.) are found in different frequency ranges or with different characteristic sound patterns.

In the voice recognition procedure 303, the control unit 71 analyses the voice data and extracts keywords, e.g., the word "project" and the following identifier of the project, i.e., "project YYY", for instance.

Equipped with the extracted keyword "project YYY", the control unit 71 accesses the participant data base 200 shown in FIG. 2, which is stored in the memory unit 72, and looks for the participants that are associated with the currently discussed "project YYY". The control unit 71 determines 305 that the participants 2, 3, 4 are involved in the "project YYY".

Based on this result, the control unit 71 controls 306 the layout 307 of the screen image that is to be sent to the screens of the output means 12, 22, 32, 42 of all participants 1, 2, 3, 4 of the video conference. The control unit 71 determines 306 that the participant 1, being the main speaker, is shown in the right half of the screen and that the other participants 2, 3, 4 are shown one below the other on the left half of the screen.

At a later time, the participant 1 is still the main speaker, but meanwhile the project that is discussed by the participant 1 has changed to the "project XXX" 311. In analogy to the above described approach, the control unit 71 extracts 313 the keyword "project XXX" from the voice data and determines 315 that, according to the participant data base 200, the participants 2 and 4 are involved in the "project XXX".

Based on this result, the control unit 71 triggers a change in the layout 317 of the screen image that is to be sent to the screens of the output means 12, 22, 32, 42 of all participants 1, 2, 3, 4 of the video conference. The control unit 71 determines 316 that the participant 1, being the main speaker, is shown in the right half of the screen and that the participants 2 and 4 are shown one below the other on the left half of the screen.

The invention claimed is:

1. A method of controlling a video conference with two or more participants, the method comprising:
   dynamically determining a topic of the video conference;
   accessing a participant data base including associations of one or more of the participants with one or more respective attributes;
   mapping the determined topic to one or more of the one or more respective attributes;
   selecting from the one or more participants associated with the one or more respective attributes one or more participants who are associated with the determined topic according to said mapping; and
   displaying one or more of the selected participants on a screen.

2. The method of claim 1, comprising:
   monitoring a voice traffic exchanged between the two or more participants during the video conference;
   converting the monitored voice traffic to a sequence of textual entities; and
   extracting keywords from the sequence of textual entities for determination of the topic of the video conference.

3. The method of claim 2, comprising:
   establishing a dynamic statistics of the keywords;
   deducing the topic of the video conference from the established dynamic statistics of the keywords.

4. The method of claim 1, comprising:
   determining the topic of the video conference based on a pre-defined agenda of the video conference.

5. The method of claim 1, comprising:
   determining a change of the topic of the video conference; and
   continuously adapting the display of the one or more of the selected participants on the screen corresponding to the change.

6. The method of claim 1, comprising:
   automatically and/or manually generating the participant data base, the one or more respective attributes referring to a skill and/or a task of the respective participants.

7. The method of claim 1, comprising:
   displaying simultaneously at least one speaking participant of the video conference and all of the selected participants on the screen, each in a separate window.

8. The method of claim 1, comprising:
   storing one or more pre-defined attributes in a directory;
   upon a participant joining the video conference, providing the joining participant with a selection menu for selecting one or more of the pre-defined attributes from the directory as being associated with the joining participant; and
   storing an entry in the participant data base, the entry comprising an association of the joining participant with the selected one or more attributes.

9. A video conference server for controlling a video conference with two or more participants, the video conference server comprising:
   a control unit adapted to dynamically determine a topic of the video conference;
   access a participant data base comprising associations of one or more of the participants with one or more respective attributes;
   map the determined topic to one or more of the one or more respective attributes;
   select from the one or more participants associated with the one or more respective attributes one or more participants who are associated with the determined topic according to said mapping; and
   control the display of one or more of the selected participants on a screen.

10. A non-transitory computer readable medium carrying instructions for controlling a video conference with two or more participants, when executed by a video conference server by:
    dynamically determining a topic of the video conference;
    accessing a participant data base comprising associations of one or more of the participants with one or more respective attributes;
    mapping the determined topic to one or more of the one or more respective attributes;
    selecting from the one or more participants associated with the one or more respective attributes one or more participants who are associated with the determined topic according to said mapping; and
    triggering the display of one or more of the selected participants on a screen.

* * * * *